United States Patent [19]

Luecke et al.

[11] Patent Number: 5,419,522
[45] Date of Patent: May 30, 1995

[54] UNIVERSAL OPTICAL MOUNT

[75] Inventors: Francis S. Luecke, San Jose; Alexander Tuganov, Santa Clara, both of Calif.

[73] Assignee: New Focus, Inc., Sunnyvale, Calif.

[21] Appl. No.: 879,785

[22] Filed: May 6, 1992

[51] Int. Cl.⁶ ............................................. F16C 11/06
[52] U.S. Cl. ..................... 248/288.5; 248/181;
  248/481; 269/75; 403/56; 403/90; 403/122;
  403/343
[58] Field of Search ................. 248/288.3, 288.5, 181,
  248/481, 231.3, 316.2; 403/87, 122, 135, 90, 55,
  56, 114, 115, 127, 131, 343; 269/75, 74, 77;
  285/163, 164, 166

[56] References Cited

U.S. PATENT DOCUMENTS

| | | | |
|---|---|---|---|
| 2,460,515 | 2/1949 | Lowber et al. | 88/65 |
| 3,072,426 | 1/1963 | Gilbert | 403/115 |
| 3,177,761 | 9/1963 | Redner | 88/14 |
| 3,399,591 | 9/1964 | Drougard et al. | 88/14 |
| 3,407,364 | 4/1965 | Turner | 332/7.51 |
| 3,466,129 | 9/1969 | Agatsuma et al. | 356/115 |
| 3,574,441 | 4/1971 | Harris et al. | 350/150 |
| 3,838,906 | 10/1974 | Kumada | 350/150 |
| 3,892,470 | 7/1975 | Lotspeich | 350/157 |
| 3,923,379 | 12/1975 | Kumada | 350/150 |
| 4,030,047 | 6/1977 | Fletcher et al. | 331/94.5 |
| 4,123,141 | 10/1978 | Schuler | 350/159 |
| 4,129,357 | 12/1978 | Title | 350/157 |
| 4,190,810 | 2/1980 | Bayley | 331/94.5 |
| 4,232,275 | 11/1980 | Kolb, Jr. | 331/94.5 |
| 4,240,046 | 12/1980 | Kolb, Jr. et al. | 331/94.5 |
| 4,299,490 | 11/1981 | Cahill et al. | 356/350 |
| 4,305,046 | 12/1981 | LeFloch et al. | 331/94.5 |
| 4,492,488 | 1/1985 | Warshawsky | 403/115 |
| 4,700,600 | 10/1987 | Pickett | 89/165 |
| 4,927,237 | 5/1990 | Hart | 350/319 |
| 4,961,634 | 10/1990 | Chipman et al. | 350/403 |
| 5,033,830 | 7/1991 | Jameson | 350/403 |
| 5,104,103 | 4/1992 | Auchinleck et al. | 248/288.5 X |

FOREIGN PATENT DOCUMENTS

| | | | |
|---|---|---|---|
| 722451 | 12/1931 | France | 403/90 |
| 865927 | 3/1941 | France | 403/90 |
| 1033442 | 7/1953 | France | 248/181 |
| 1317518 | 1/1963 | France | 403/90 |
| 635871 | 9/1936 | Germany | 248/181 |
| 2256896 | 10/1973 | Germany | 248/181 |
| 519176 | 3/1940 | United Kingdom | 403/56 |
| 602683 | 6/1948 | United Kingdom | 248/181 |
| 688685 | 3/1953 | United Kingdom | 403/90 |

*Primary Examiner*—Rinaldi I. Rada
*Assistant Examiner*—Clark F. Dexter
*Attorney, Agent, or Firm*—Hugh D. Jaeger

[57] ABSTRACT

An adjustable optical element mount having a pair of ball elements, respectively attached to a base and optical element, within a pair of sockets positioned at opposite ends of a spindle which supports a screw actuated cam element positioned within the spindle and between a pair of plungers which simultaneously engage and clamp the both ball elements against the sockets in response to rotation of the screw to hold the ball elements in a desired position.

13 Claims, 4 Drawing Sheets

UNIVERSAL OPTICAL MOUNT

BACKGROUND OF THE INVENTION

1. Field of the Invention

This invention relates generally to optical instruments, and particularly to a lockable, double ball clamp allowing easy adjustment in five degrees of freedom.

2. Description of the Prior Art

The use of adjustable mounting or clamping devices is a common technique in the field of experimental optics. Such mounts are used to position optical elements, such as light sources and other optical devices. Since these devices do not conform to a standard set of dimensions, each may require mounting at a different vertical distance (height) above the optical bench or other work surface. These devices have widely varying sizes and shapes, and are frequently positioned in close proximity to each other. This leads to the requirement that the mount (clamp) be capable of lateral adjustment to accommodate the case where the mount for the clamp cannot be positioned directly on the optical axis of the system. The requirements are further complicated by the fact that some devices may have to be positioned at odd angles to each other and to the optical bench.

Even a minute amount of movement can have a substantial effect on the optical system being implemented, so the adjustable clamp must be rigid enough to avoid any movement once it has been set up. The required rigidity must not be obtained at the sacrifice of adjustability. In other words, the adjustable clamp must be capable of being loosened to the point where the position of the clamp can be altered. This means that the clamping action must not have "sticking" characteristics. That is, when the clamp is loosened for repositioning, there must not be a substantially larger force required to break the clamp loose than is retained by the clamp after repositioning.

While a wide variety of adjustable clamps are available, each has shortcomings. Commonly used clamps frequently utilize split bores or sockets which accommodate posts or balls and can be tightened by reducing the diameter of the bore or socket by means of a screw extending across the split. In addition to the problems discussed above, tightening of the clamp introduces movement of the optical device being positioned such that the clamp must be iteratively repositioned and tightened in a fashion to accommodate the movement induced by the tightening. In other words, the optical device must be offset from the desired position in order to accommodate the movement induced by the tightening action. This particular problem is exacerbated when the clamp tends to bind when loosened for repositioning. This leads to lengthy set up times and unduly complicates the erection of the optical system. Alternatively, this shortcoming can sometimes be overcome by the use of clamps having limited freedom of movement, but this leads to other complications and expense, for example, a requirement for more clamps. While the use of two clamps where one might suffice seems to be a small disadvantage, movement of one clamp may require that the related dependent clamp be repositioned. It may therefore be said that every additional clamp introduces complexity to the system and increases the time required for set up.

Thus, there is a need for a mechanical clamp which allows the optical device being held to be freely rotated, moved in the vertical and horizontal planes, as well as allowing displacement from the mounting point on the optical bench. All of this must be accomplished without movement introduced by tightening the clamp, or causing the clamp to stick when it is loosened for adjustment.

SUMMARY OF THE INVENTION

The optical mount of this invention includes a pair of ball and socket elements positioned at opposite ends of a spindle having snap rings which hold the sockets in rotational engagement to allow independent rotation of each. A screw actuated wedge, positioned within the spindle, has a pair of inclined plane surfaces, each of which coacts with a complementary planar surface on a pair of plungers which contact the ball surface opposite the open end of the sockets. When the screw actuated cam moves to cam the plungers outward, the resulting force simultaneously locks the balls against the sockets and locks the snap rings against the spindle to prevent the cam from moving.

In this fashion, the mount provides for free movement in the vertical, horizontal and rotational axes, as well as displacement from the position of attachment to the optical bench, base or other support for the optical system. Such movement is provided. without sacrifice of the holding power of the clamp or the introduction of sticking or binding when the clamp is loosened for adjustment. The mount is easily adjusted since a single screw provides all the clamping action.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
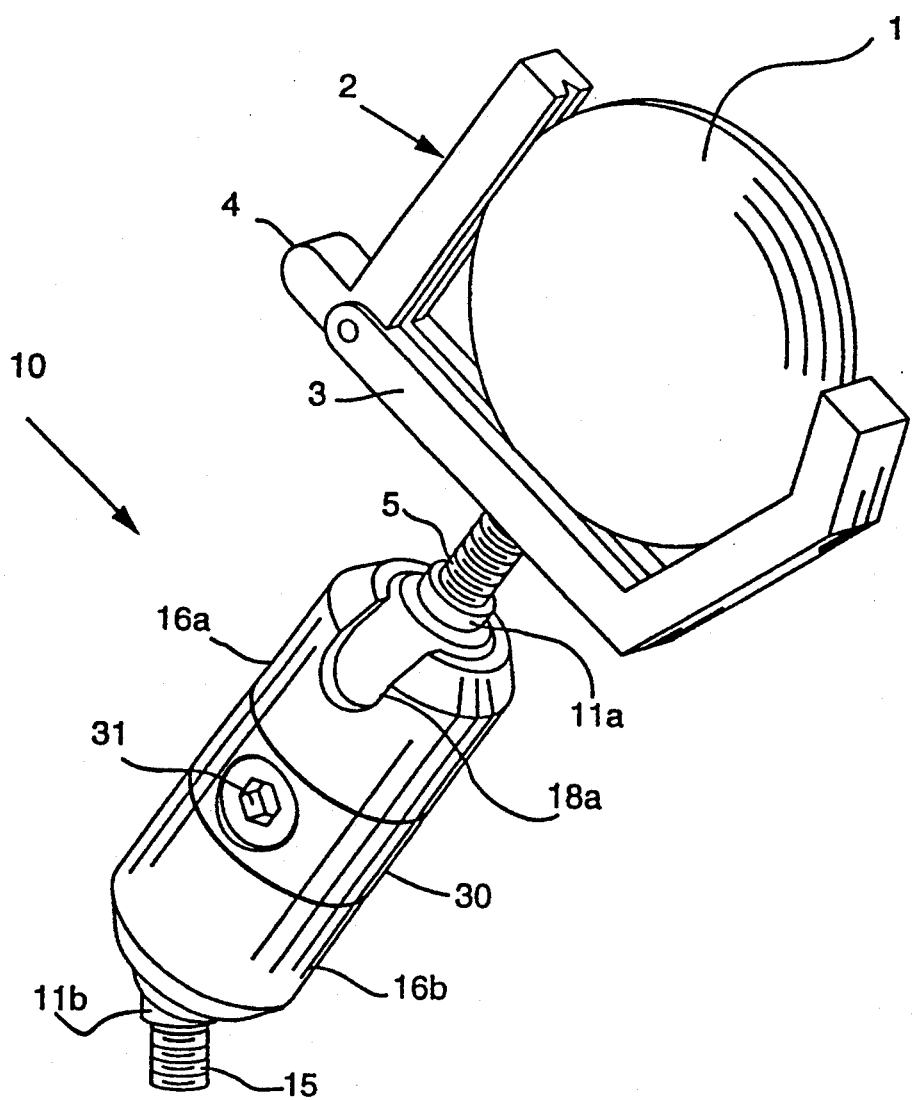
FIG. 1 is a perspective view of the optical mount positioned on a base and holding a lens.

The optical mount 10 of this invention, as shown in FIG. 1, is adjustable to hold optical elements such as lens 1 in a predetermined position. Lens 1 is held by lens mount 2 having an arm 3 and a spring loaded adjustable arm 4. A support rod 5, affixed to the arm 3, is fastened to the mounting post rod 11a by means of internal threads on support rod 5 and complementary external threads on mounting post 11a. At the opposite end of the optical mount 10, the mounting post 11b is affixed to the support rod 15, which in turn is fastened to a suitable base or bench by means of threads or other suitable means not shown.

Ball caps 16a and 16b retain the movable ball elements 17a and 17b preferably fabricated from a material such as hard steel in a conventional ball and socket arrangement. Extended motion slot 18a in ball cap 16a and a corresponding extended motion slot, 18a (shown in FIG. 2) in ball cap 16b allow for extended rotation of the movable balls 17a and 17b. Spindle 30 contains a locking screw 31 which provides a clamping action to retain the optical mount 10 in a predetermined selected position. Ball caps 16a and 16b are rotatable with respect to spindle 30 to permit the extended motion slots to be oriented at any desired angle to each other. The clamping action provided by locking screw 31 also serves to clamp the ball caps 16a and 16b to spindle 30. In setting up an optical system utilizing the adjustable mount, the clamp is affixed to a suitable base and the optical device to be positioned is affixed to the other end of the adjustable mount. The optical device is then moved to the desired position and held while the locking screw 31 is used to tighten the mount. Alternatively, the locking screw 31 can be tightened to the point where the clamping action is just loose enough to permit movement to the desired position, whereupon the locking screw is further tightened to prevent further movement.

Figure 2:
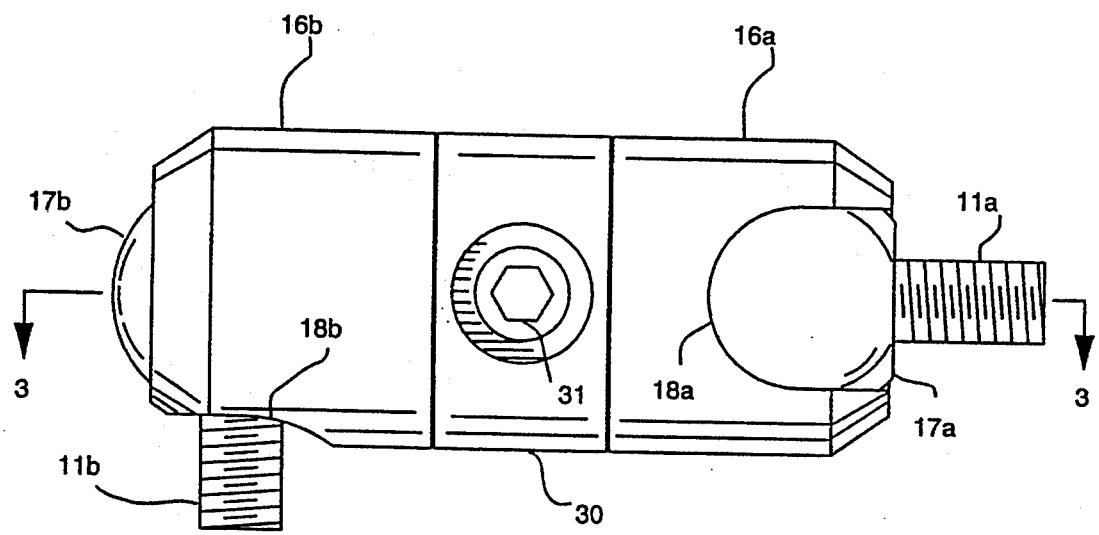
FIG. 2 is a side view of the adjustable mount.

FIG. 2 shows the adjustable optical mount of this invention with the mounting posts 11a and 11b positioned at right angles to each other and 90 degrees offset with respect to the extended motion slots 18a and 18b.

Figure 3:
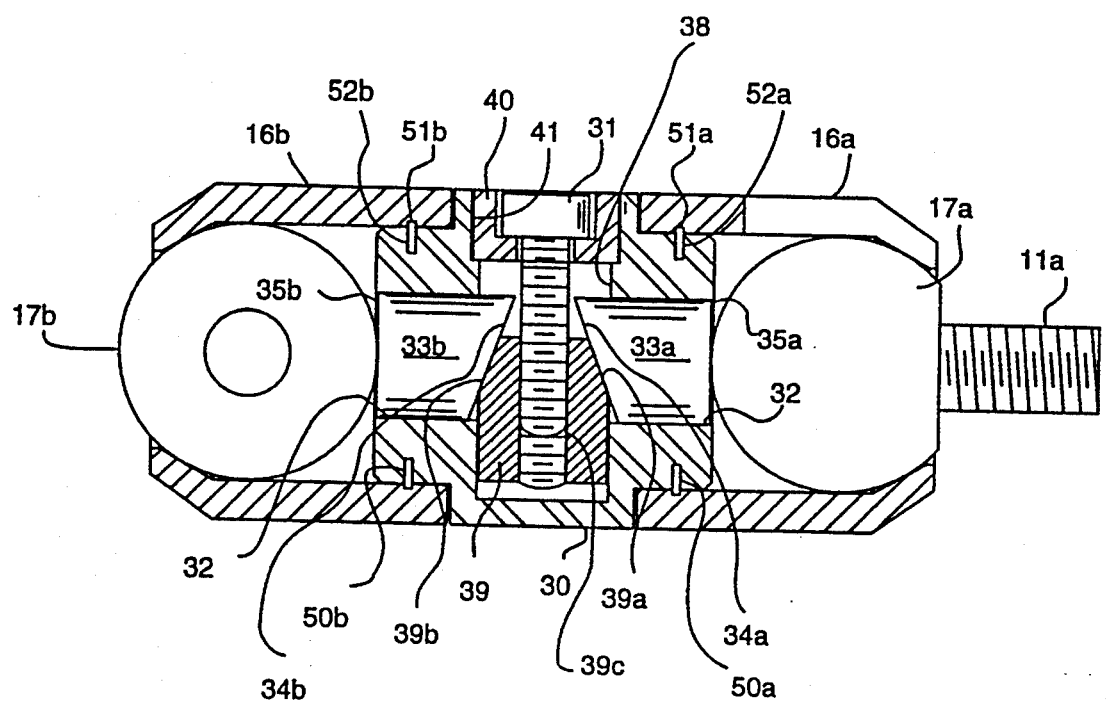
FIG. 3 is a sectional view of the adjustable mount taken along line 3—3 of FIG. 2; and, FIG. 4 is an exploded sectional view of the optical mount shown in FIG. 3.

FIG. 3 is a cross-sectional view of adjustable optical mount 10 taken along the line 3—3 of FIG. 2. It can be seen that movable balls 17a and 17b are retained in position by the constricted end portions of the ball caps which provide a socket complementary to the movable balls 17a and 17b. Spindle 30 has an axial bore 32 extending completely through the spindle. A pair of plungers 33a and 33b preferably fabricated from a soft material such as brass, slide in axial bore 32 in spaced apart relationship with facing planar cam surfaces 34a and 34b. Plungers 33a and 33b have flat end surfaces 35a and 35b contacting the movable balls 17a and 17b.

Spindle 30 has a transverse bore 38 which extends partially through spindle 30 and intersects axial bore 32. Positioned within transverse bore 38 is a transverse cam element in the form of cylindrical wedge 39 having first and second planar cam surfaces 39a and 39b, which force plungers 33a and 33b against the movable balls 17a and 17b when locking screw 31, extending into threaded hole 39c, is tightened. A washer 40 sits within the seat 41 and provides a bearing surface for the shoulder of locking screw 31. The ball caps 16a and 16b are retained to spindle 30 by means of snap rings 50a and 50b, which fit into grooves 51a and 51b within the ball caps 16a and 16b, respectively, and grooves 52a and 52b in spindle 30. The snap rings allow the ball caps 16a and 16b to be rotated with respect to spindle 30 when locking screw 31 is loose.

Figure 4:
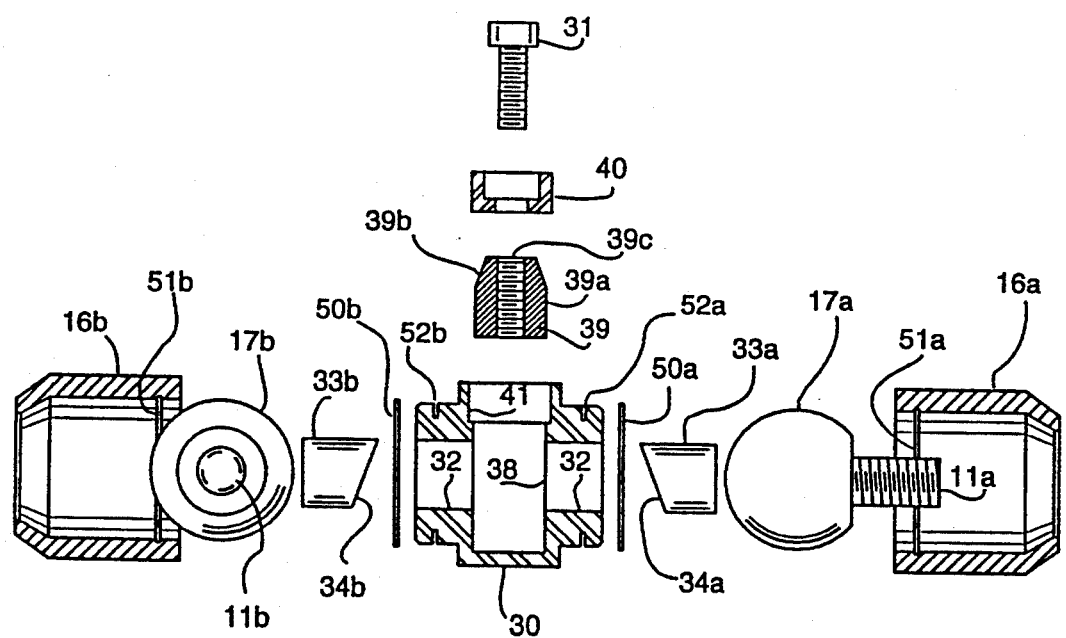

A particularly advantageous feature of the invention is the simplicity of the assembly process. With reference to FIG. 4, the adjustable optical mount is assembled by first placing the movable balls 17a and 17b into the ball caps 16a and 16b. The locking screw 31 is then passed through washer 40 and threaded into cylindrical wedge 39. The assembly constituting locking screw 31, washer 40 and transverse cam element 39 is then fitted into the transverse bore 38, with the end of transverse cam element 39 near the bottom of transverse bore 38. The plungers 33a and 33b are then placed into opposite ends of axial bore 32 with the planar cam surface 34a and 34b facing one another and the first and second cam surfaces 39a and 39b of transverse cam element 39. Snap rings 50a and 50b are expanded and placed within the grooves 52a and 52b in spindle 30. The ends of spindle 30 are then positioned within the ball caps 16a and 16b, the snap rings 50a and 50b are compressed to fit within the ball caps 16a and 16b, and the ball caps 16a and 16b are moved toward each other until the snap rings 50a and 50b are aligned with grooves 51a and 51b and expand into the grooves. The assembly is then complete. it will be noted that once the assembly is complete, the device cannot be inadvertently disassembled and there are no parts which can fall off or become lost.

Various modifications can be made to the present invention without departing from the apparent scope hereof.

I claim:

1. An adjustable mount for optical devices comprising:

a. first and second ball caps having an inner cylindrical surface containing a groove adjacent a first end of said ball cap for a snap ring, an outer cylindrical surface, and a reduced diameter axial aperture at a second end of said ball cap, for retaining and clamping a movable ball element;

b. first and second movable ball elements positioned within said first and second ball caps, respectively;

c. first and second mounting posts respectively affixed to said first and second movable ball elements and projecting through said reduced diameter axial apertures at said second ends of said ball caps;

d. a spindle having first and second outer cylindrical surfaces received in said inner cylindrical surfaces of said first ends of said first and second ball caps, an external groove for a snap ring on each of said first and second cylindrical surfaces, an axial bore extending substantially parallel with said first and second cylindrical surfaces for receiving a pair of cylindrical plungers and a transverse bore located between said first and second outer cylindrical surfaces for receiving a transverse cam element;

e. first and second snap ring means positioned within said grooves in said ball caps and said spindle to retain said ball caps in rotational engagement with said spindle;

f. first and second cylindrical plungers positioned within said axial bore of said spindle and spaced from each other, each having a first end adjacent said first and second ball elements, respectively and a second facing end having a planar cam surface angularly oriented with respect to an axis of said transverse bore;

g. a transverse cam element positioned within said transverse bore said transverse cam element having a first cylindrical portion and first and second planar cam surfaces extending from said first cylindrical portion on opposing sides of said transverse cam element to simultaneously engage said planar cam surfaces of said first and second cylindrical plungers respectively, upon transverse movement of said transverse cam element;

h. said transverse cam element further including a threaded hole axially positioned with respect to said first cylindrical portion thereof for receipt of a locking screw; and, i. said locking screw passing through the transverse bore of said spindle axially positioned with respect to and extending into, said threaded hole, and adapted, upon rotation, to move said cam element transversely further into said spindle, simultaneously causing said transverse cam element to move said plungers axially outward against said balls whereby said balls are clamped against said ball caps and said ball caps are clamped against said snap rings to lock said ball elements and said mounting posts of said mount in position.

2. An adjustable mount according to claim 1 further including a constricted end portion of said second end of said ball caps forming said reduced diameter axial apertures and an extended motion slot in each of said constricted end portions of said second ends of said ball caps extending radially through said constricted end portions of said ball cads and said outer cylindrical surface for a distance sufficient to permit rotation of said balls to a position with said mounting posts perpendicular to the axis of said cylinder.

3. An adjustable mount according to claim 2 wherein said first and second cylindrical plungers are of a material softer than the material of said ball elements.

4. An adjustable mount according to claim 3 wherein said ball elements are fabricated from steel and said plungers are fabricated from brass.

5. An adjustable mount according to claim 2 wherein said transverse bore extends completely through said spindle at right angles to the axis of said first and second outer cylindrical surfaces of said spindle and the center line of said transverse bore intersects the axis of said first and second outer cylindrical surfaces of said spindle.

6. An adjustable mount according to claim 5 further including;
 a. an enlarged cylindrical portion of said transverse bore extending inwardly from the outer cylindrical surface of said spindle;
 b. washer means positioned within said enlarged cylindrical portion of said transverse bore, said washer means having an outer diameter corresponding to said enlarged cylindrical portion of said transverse bore and an axial hole through which a threaded portion of said locking screw extends, whereby said washer provides a bearing to prevent said locking screw from passing into the interior of said transverse bore when tightened.

7. An adjustable mount according to claim 6 wherein at least a portion of each of the planar cam surfaces of said cylindrical plungers extends into said transverse bore to prevent removal of said transverse cam element from said transverse bore.

8. An adjustable mount according to claim 7 wherein said planar cam surfaces of said cylindrical plungers are positioned with the closest portion of said planar cam surfaces in proximity to said enlarged cylindrical portion of said transverse bore and separated from each other by a distance less than the diameter of said first cylindrical portion of said transverse cam element.

9. An adjustable mount according to claim 1 wherein said first and second cylindrical plungers are of a material softer than the material of said ball elements.

10. An adjustable mount according to claim 1 wherein said ball elements are fabricated from steel and said first and second cylindrical plungers are fabricated from brass.

11. An adjustable mount according to claim 1 further including:
 a. an enlarged cylindrical portion of said transverse bore extending inwardly from the outer cylindrical surface of said spindle;
 b. washer means positioned within said enlarged cylindrical portion of said transverse bore, said washer means having an outer diameter corresponding to said enlarged cylindrical portion of said transverse bore and an axial hole through which a thread portion of said locking screw extends, whereby said washer provides a bearing to prevent said locking screw from passing into the interior of said transverse bore when tightened.

12. An adjustable mount according to claim 11 wherein at least a portion of each of said planar cam surfaces of said cylindrical plungers extends into said transverse bore to prevent removal of said transverse cam element from said transverse bore.

13. An adjustable mount according to claim 11 wherein said planar cam surfaces of said cylindrical plungers are positioned with the closest portion of said planar cam surfaces in proximity to said enlarged cylindrical portion of said transverse bore and separated from each other by a distance less than the diameter of said first cylindrical portion of said transverse cam element.

* * * * *